US012588018B2

(12) United States Patent
Huang

(10) Patent No.: US 12,588,018 B2
(45) Date of Patent: Mar. 24, 2026

(54) METHODS AND APPARATUSES FOR SOLICITING TRIGGER-BASED PHYSICAL LAYER PROTOCOL DATA UNIT TRANSMISSION IN WIRELESS LOCAL AREA NETWORK

(71) Applicant: GUANGDONG OPPO MOBILE TELECOMMUNICATIONS CORP., LTD., Dongguan (CN)

(72) Inventor: Lei Huang, Singapore (SG)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 276 days.

(21) Appl. No.: 18/204,756

(22) Filed: Jun. 1, 2023

(65) Prior Publication Data

US 2023/0309087 A1     Sep. 28, 2023

Related U.S. Application Data

(63) Continuation of application No. PCT/CN2021/135181, filed on Dec. 2, 2021.

(30) Foreign Application Priority Data

Dec. 2, 2020     (SG) ............................ 10202012038U

(51) Int. Cl.
*H04W 72/1263*     (2023.01)
*H04L 5/00*     (2006.01)
(Continued)

(52) U.S. Cl.
CPC ....... *H04W 72/1263* (2013.01); *H04L 5/0044* (2013.01); *H04W 72/0457* (2023.01); *H04W 84/12* (2013.01)

(58) Field of Classification Search
CPC ......... H04W 72/1263; H04W 72/0457; H04W 72/0453; H04W 72/23; H04W 5/0044; H04W 84/12; H04W 74/006; H04W 88/02
(Continued)

(56) References Cited

U.S. PATENT DOCUMENTS

2018/0014327 A1     1/2018  Park
2018/0062805 A1     3/2018  Huang
(Continued)

FOREIGN PATENT DOCUMENTS

CN          107820683 A          3/2018
CN          109315013 A          2/2019
(Continued)

OTHER PUBLICATIONS

Examination report No. 1 for standard patent application issued in corresponding Australian Application No. 2021393650, dated Mar. 31, 2025, 4 pages.
(Continued)

*Primary Examiner* — Candal Elpenord
(74) *Attorney, Agent, or Firm* — BAYES PLLC

(57)     ABSTRACT

Embodiments of the disclosure provide methods and apparatuses for soliciting a trigger-based (TB) physical layer protocol data unit (PPDU) transmission in wireless local area network (WLAN). The method includes: receiving, by a STA, a trigger frame which is used to solicit a type of TB PPDU transmissions from a plurality of STAs in the WLAN, the type of TB PPDU transmissions including high efficiency (HE) trigger-based (TB) PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU, and
(Continued)

generating, by an access point (AP), a trigger frame based on a type of TB PPDU transmissions to be solicited from a plurality of stations (STAs) in the WLAN, wherein the type of TB PPDU transmissions comprises high efficiency (HE) TB PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU — 1301 transmitting, by the AP, the generated trigger frame to the plurality of STAs — 1302 transmitting, by the STA, the solicited TB PPDU in the BW indicated by the one or two subfields in the trigger frame.

20 Claims, 8 Drawing Sheets

(51) Int. Cl.
    *H04W 72/0457*     (2023.01)
    *H04W 84/12*     (2009.01)

(58) Field of Classification Search
    USPC ................................................. 370/329–330
    See application file for complete search history.

(56)           References Cited

U.S. PATENT DOCUMENTS

| | | | |
|---|---|---|---|
| 2018/0146426 A1 | 5/2018 | Park | |
| 2018/0220456 A1 | 8/2018 | Kim et al. | |
| 2019/0166590 A1 | 5/2019 | Verma et al. | |
| 2019/0349997 A1 | 11/2019 | Park | |
| 2020/0015219 A1 | 1/2020 | Asterjadhi et al. | |
| 2020/0037356 A1* | 1/2020 | Lou | H04W 74/08 |
| 2020/0045656 A1 | 2/2020 | Verma et al. | |
| 2020/0163129 A1 | 5/2020 | Ko et al. | |
| 2020/0177425 A1 | 6/2020 | Chen | |
| 2020/0196236 A1 | 6/2020 | Park | |
| 2020/0228634 A1 | 7/2020 | Noh et al. | |
| 2020/0328925 A1 | 10/2020 | Yu et al. | |
| 2021/0410149 A1* | 12/2021 | Xia | H04W 72/1268 |
| 2022/0030604 A1* | 1/2022 | Noh | H04W 72/121 |
| 2023/0261849 A1* | 8/2023 | Gan | H04L 5/0044 |
| 2023/0319629 A1* | 10/2023 | Ko | H04L 1/0007 |
| | | | 370/230 |

FOREIGN PATENT DOCUMENTS

| | | | |
|---|---|---|---|
| CN | 109996343 A | 7/2019 | |
| CN | 110768757 A | 2/2020 | |
| CN | 110913480 A | 3/2020 | |
| CN | 111669260 A | 9/2020 | |
| EP | 4186334 A1 | 5/2023 | |
| JP | 2023547491 A | 11/2023 | |
| WO | 2017030342 A1 | 2/2017 | |
| WO | 2019174557 A1 | 9/2019 | |
| WO | 2019240792 A1 | 12/2019 | |
| WO | 2020145890 A1 | 7/2020 | |
| WO | 2022015034 A1 | 1/2022 | |
| WO | 2022020682 A1 | 1/2022 | |
| WO | 2022089553 A1 | 5/2022 | |
| WO | 2022100492 A1 | 5/2022 | |

OTHER PUBLICATIONS

Extended European Search Report issued in corresponding European application No. 21900083.3, mailed Mar. 11, 2024.
International Search Report issued in international application No. PCT/CN2021/135181, mailed Mar. 2, 2022.
Written Opinion of the International Searching Authority issued in international application No. PCT/CN2021/135181, mailed Mar. 2, 2022.
Huawei, IEEE P802.11 Wireless LANs—Specification framework for TGbe, 19/1262r20, Date: Nov. 10, 2020.
Qualcomm, Enhanced Trigger Frame for EHT Support, doc.: IEEE 802.11-20/1429r2, Date: Oct. 13, 2020.
LG Electronics, UL BW subfield design in Trigger frame, doc.: IEEE 802.11-20/1911r0, Date: Dec. 1, 2020.
IEEE P802.11 ax™/D8.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, Oct. 2020.
Wilus Inc., TB PPDU Format Signaling in Trigger Frame, doc.: IEEE 802.11-20/1192r1, Date: Aug. 6, 2020.
Samsung, Trigger Frame for Frequency-domain A-PPDU Support, doc.: IEEE 802.11-20/0831r2, Date: May 20, 2020.
Huawei, Backward compatible EHT trigger frame follow up, doc.: IEEE 802.11-20/1808-01-00be, Date: Nov. 1, 2020.
Panasonic Corporation, Discussion on EHT PPDU Formats, doc.: IEEE 802.11-20/0031r2, Date: Jan. 16, 2020.
Samsung, Thoughts on U-SIG Contents, doc.: IEEE 802.11-20/0959r1, Date: Jun. 25, 2020.
LGE, IEEE P802.11 Wireless LANs PDT-EHT-PPDU-Format-Draft, doc.: IEEE 802.11-09/1034r140, Date: Aug. 27, 2020.
Qualcomm, Trigger Frame Content, doc.: IEEE 802.11-15/1344r1, Date: Nov. 9, 2015.
Notice of Reasons for Refusal issued in corresponding Japanese Application No. 2023-532426, mailed on Jul. 1, 2025, 12 pages.
Backward compatible EHT trigger frame follow up, dated Nov. 1, 2020, doc.: IEEE 802.11-20/1808-00-00be, 18 pages.
Notice of Priority Examination of Patent Application issued in corresponding Chinese Application No. 20231138984.6, dated Sep. 19, 2024, 9 pages.
First Office Opinion Notice issued in corresponding Chinese Application No. 20231138984.6, dated Sep. 26, 2024, 20 pages.
First Office Action issued in corresponding Canadian Application No. 3,199,708, dated Oct. 7, 2024, 10 pages.
"Enhanced Trigger Frame for EHT Support", Steve Shellhammer (Qualcomm), doc.: IEEE 802.11-20/1429r1, dated Sep. 14, 2020, 20 pages.
Notice of Reasons for Refusal issued in corresponding Japanese Application No. 2023-532426, mailed on Dec. 9, 2025, 9 pages.
Invitation to Response to Written Opinion issued in corresponding Singpore Application No. 11202304027R, mailed on Nov. 30, 2025, 65 pages.

* cited by examiner

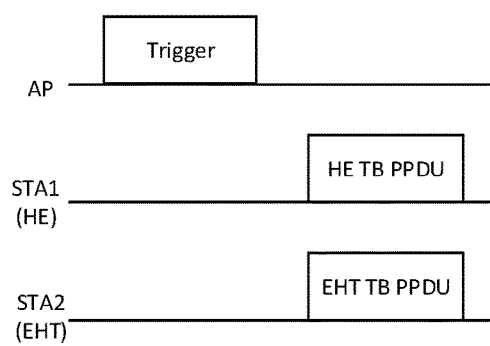

FIG. 5C

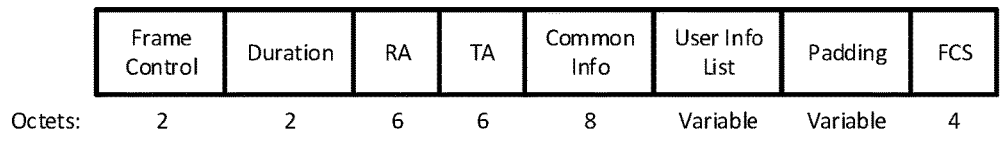

| Frame Control | Duration | RA | TA | Common Info | User Info List | Padding | FCS |
|---|---|---|---|---|---|---|---|
| Octets: 2 | 2 | 6 | 6 | 8 | Variable | Variable | 4 |

FIG. 6A

| AID12 | RU Allocation | UL FEC Coding Type | UL HE-MCS | UL DCM/ Lower or Upper 160 MHz Segment | SS Allocation/ RA-RU Information | UL Target RSSI | HE/EHT Format | Trigger Dependent User Info |
|---|---|---|---|---|---|---|---|---|
| Bits: 12 | 8 | 1 | 4 | 1 | 6 | 7 | 1 | Variable |

FIG. 6B

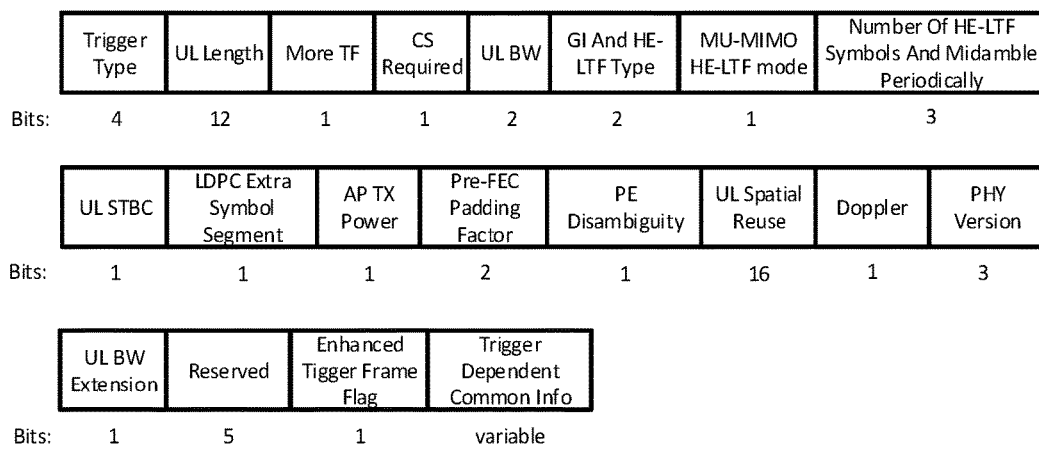

| Trigger Type | UL Length | More TF | CS Required | UL BW | GI And HE-LTF Type | MU-MIMO HE-LTF mode | Number Of HE-LTF Symbols And Midamble Periodically |
|---|---|---|---|---|---|---|---|
| Bits: 4 | 12 | 1 | 1 | 2 | 2 | 1 | 3 |

| UL STBC | LDPC Extra Symbol Segment | AP TX Power | Pre-FEC Padding Factor | PE Disambiguity | UL Spatial Reuse | Doppler | PHY Version |
|---|---|---|---|---|---|---|---|
| Bits: 1 | 1 | 1 | 2 | 1 | 16 | 1 | 3 |

| UL BW Extension | Reserved | Enhanced Tigger Frame Flag | Trigger Dependent Common Info |
|---|---|---|---|
| Bits: 1 | 5 | 1 | variable |

FIG. 7

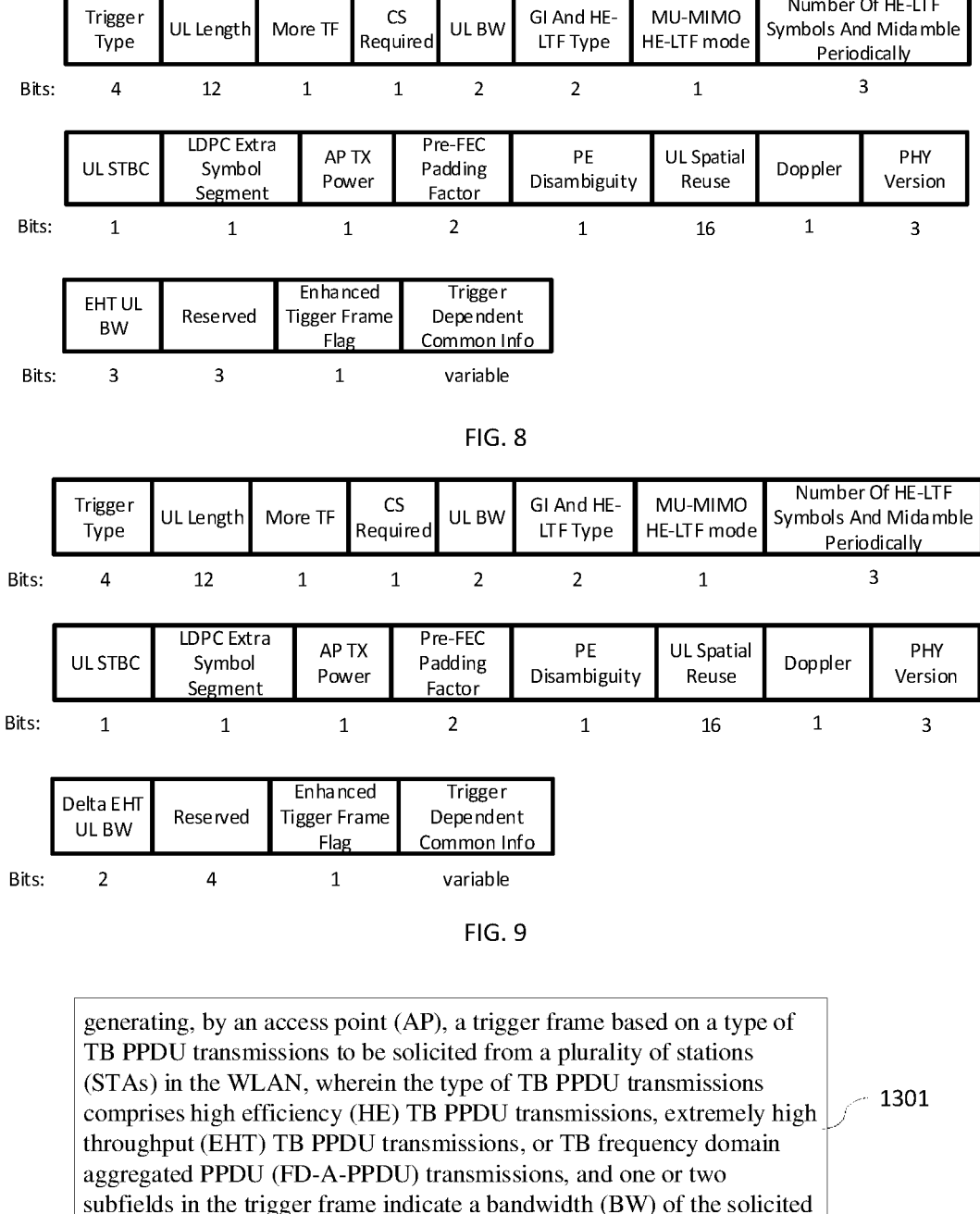

| Trigger Type | UL Length | More TF | CS Required | UL BW | GI And HE-LTF Type | MU-MIMO HE-LTF mode | Number Of HE-LTF Symbols And Midamble Periodically |
|---|---|---|---|---|---|---|---|
| Bits: 4 | 12 | 1 | 1 | 2 | 2 | 1 | 3 |

| UL STBC | LDPC Extra Symbol Segment | AP TX Power | Pre-FEC Padding Factor | PE Disambiguity | UL Spatial Reuse | Doppler | PHY Version |
|---|---|---|---|---|---|---|---|
| Bits: 1 | 1 | 1 | 2 | 1 | 16 | 1 | 3 |

| EHT UL BW | Reserved | Enhanced Tigger Frame Flag | Trigger Dependent Common Info |
|---|---|---|---|
| Bits: 3 | 3 | 1 | variable |

FIG. 8

| Trigger Type | UL Length | More TF | CS Required | UL BW | GI And HE-LTF Type | MU-MIMO HE-LTF mode | Number Of HE-LTF Symbols And Midamble Periodically |
|---|---|---|---|---|---|---|---|
| Bits: 4 | 12 | 1 | 1 | 2 | 2 | 1 | 3 |

| UL STBC | LDPC Extra Symbol Segment | AP TX Power | Pre-FEC Padding Factor | PE Disambiguity | UL Spatial Reuse | Doppler | PHY Version |
|---|---|---|---|---|---|---|---|
| Bits: 1 | 1 | 1 | 2 | 1 | 16 | 1 | 3 |

| Delta EHT UL BW | Reserved | Enhanced Tigger Frame Flag | Trigger Dependent Common Info |
|---|---|---|---|
| Bits: 2 | 4 | 1 | variable |

FIG. 9 generating, by an access point (AP), a trigger frame based on a type of TB PPDU transmissions to be solicited from a plurality of stations (STAs) in the WLAN, wherein the type of TB PPDU transmissions comprises high efficiency (HE) TB PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU    1301 transmitting, by the AP, the generated trigger frame to the plurality of STAs    1302

FIG. 10

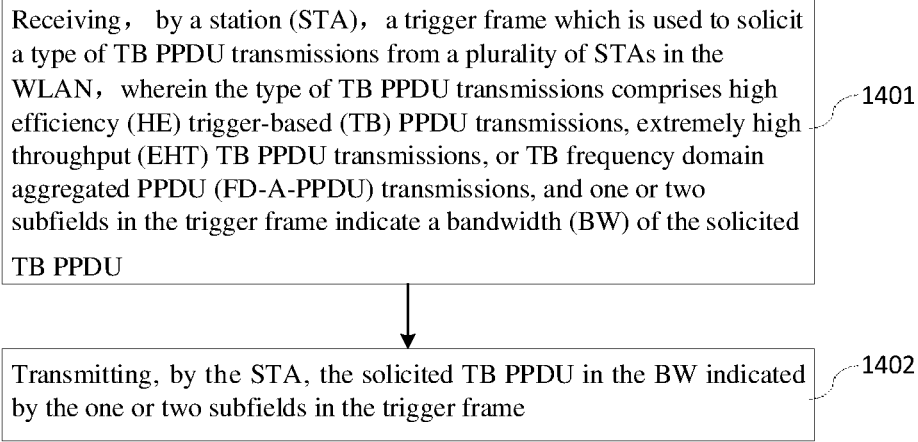

Receiving， by a station (STA)， a trigger frame which is used to solicit a type of TB PPDU transmissions from a plurality of STAs in the WLAN， wherein the type of TB PPDU transmissions comprises high efficiency (HE) trigger-based (TB) PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU    1401

Transmitting, by the STA, the solicited TB PPDU in the BW indicated by the one or two subfields in the trigger frame    1402

FIG. 11

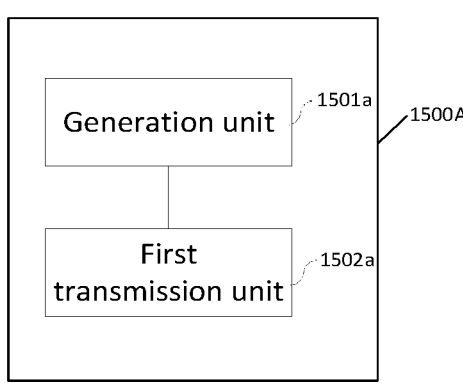

Generation unit    1501a    1500A

First transmission unit    1502a

FIG. 12A

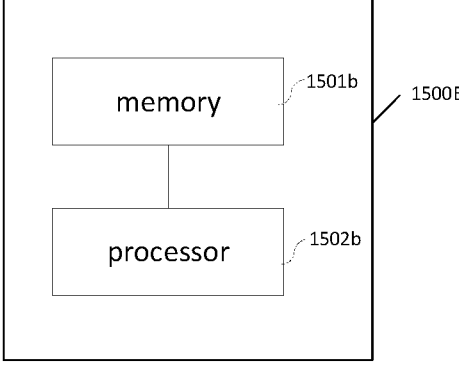

memory    1501b    1500B processor    1502b

FIG. 12B

METHODS AND APPARATUSES FOR SOLICITING TRIGGER-BASED PHYSICAL LAYER PROTOCOL DATA UNIT TRANSMISSION IN WIRELESS LOCAL AREA NETWORK

CROSS-REFERENCE TO RELATED APPLICATIONS

This application is a continuation of International Application No. PCT/CN2021/135181 filed on Dec. 2, 2021, which claims the benefit of priority to Singaporean Patent Application No. 10202012038U, entitled "Enhancing the trigger frame for IEEE 802.11be EHT WLAN", filed on Dec. 2, 2020, both of which are incorporated herein by reference in their entireties.

TECHNICAL FIELD

The disclosure relates to wireless communications, and more particularly to methods and apparatuses for soliciting a trigger-based (TB) physical layer protocol data unit (PPDU) transmission in a wireless local area network (WLAN) with a trigger frame.

BACKGROUND

Institute of Electrical and Electronics Engineers (IEEE) 802.11be extremely high throughput (EHT) WLAN supports a bandwidth (BW) up to 320 MHz. It is expected that high efficiency (HE) stations (STAs) will exist with EHT STAs in a same EHT basic service set (BSS). In order to maximize throughput of an EHT BSS with large BW, e.g., 160 MHz or 320 MHz, a frequency domain aggregated physical layer protocol data unit (FD-A-PPDU) has been proposed. In IEEE 802.11be EHT WLAN, a trigger frame can be used to solicit HE TB PPDU transmissions, EHT TB PPDU transmissions, or TB FD-A-PPDU transmission. However, it is an open issue to enhance the 802.11ax trigger frame to achieve this goal.

SUMMARY

Embodiments of the disclosure provide methods and apparatuses for soliciting a TB PPDU transmission in a WLAN with a trigger frame.

According to a first aspect of the disclosure, various embodiments of the disclosure provide a method for soliciting a TB PPDU transmission in a WLAN. The method may be implemented by an AP in the WLAN and comprises: generating, by an access point (AP), a trigger frame based on a type of TB PPDU transmissions to be solicited from a plurality of stations (STAs) in the WLAN, wherein the type of TB PPDU transmissions comprises high efficiency (HE) TB PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU, and transmitting, by the AP, the generated trigger frame to the plurality of STAs.

According to a second aspect of the disclosure, various embodiments of the disclosure provide a method for soliciting a TB PPDU transmission in a WLAN. The method may be implemented by a STA in the WLAN and comprises: receiving, by a station (STA), a trigger frame which is used to solicit a type of TB PPDU transmissions from a plurality of STAs in the WLAN, wherein the type of TB PPDU transmissions comprises high efficiency (HE) trigger-based (TB) PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU, and transmitting, by the STA, the solicited TB PPDU in the BW indicated by the one or two subfields in the trigger frame.

According to a third aspect of the disclosure, various embodiments of the disclosure provide an AP for soliciting a TB PPDU transmission in a WLAN. The AP comprises: a generation unit configured to generate a trigger frame based on a type of TB PPDU transmissions to be solicited from a plurality of stations (STAs) in the WLAN, wherein the type of TB PPDU transmissions comprises high efficiency (HE) TB PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU, and a first transmission unit configured to transmit the generated trigger frame to the plurality of STAs.

According to a fourth aspect of the disclosure, various embodiments of the disclosure provide a STA for soliciting a TB PPDU transmission in a WLAN, wherein the STA comprises: a reception unit configured to receive a trigger frame which is used to solicit a type of TB PPDU transmissions from a plurality of STAs in the WLAN, wherein the type of TB PPDU transmissions comprises high efficiency (HE) trigger-based (TB) PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU, and a second transmission unit configured to transmit the solicited TB PPDU in the BW indicated by the one or two subfields in the trigger frame.

According to a fifth aspect of the disclosure, various embodiments of the disclosure provide an AP for soliciting a TB PPDU transmission in a WLAN. The AP comprises: a memory configured to store instructions for soliciting a TB PPDU transmission in the WLAN, and a processor communicably coupled with the memory, the processor configured to execute the instructions to cause the AP to perform: generating a trigger frame based on a type of TB PPDU transmissions to be solicited from a plurality of stations (STAs) in the WLAN, wherein the type of TB PPDU transmissions comprises high efficiency (HE) TB PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU, and transmitting the generated trigger frame to the plurality of STAs.

According to a sixth aspect of the disclosure, various embodiments of the disclosure provide a STA. The STA comprises: a memory configured to store instructions for soliciting a TB PPDU transmission in the WLAN, and a processor communicably coupled with the memory, the processor configured to execute the instructions to cause the STA to perform: receiving a trigger frame which is used to solicit a type of TB PPDU transmissions from a plurality of STAs in the WLAN, wherein the type of TB PPDU transmissions comprises high efficiency (HE) trigger-based (TB) PPDU transmissions, extremely high throughput (EHT) TB PPDU transmissions, or TB frequency domain aggregated PPDU (FD-A-PPDU) transmissions, and one or two subfields in the trigger frame indicate a bandwidth (BW) of the solicited TB PPDU, and transmitting the solicited TB PPDU in the BW indicated by the one or two subfields in the trigger frame.

According to a seventh aspect of the disclosure, various embodiments of the disclosure provide a computer program product. The computer program product comprises instructions to cause a computer to perform a method for soliciting a TB PPDU transmission in a WLAN according to any embodiment of the disclosure, when executed thereon.

According to an eighth aspect of the disclosure, various embodiments of the disclosure provide a computer program. The computer program comprising instructions to cause a computer to perform a method for soliciting a TB PPDU transmission in a WLAN according to any embodiment of the disclosure, when executed thereon.

According to a ninth aspect of the disclosure, various embodiments of the disclosure provide a non-volatile storage medium. The non-volatile storage medium comprising computer program codes to cause a computer to perform a method for soliciting a TB PPDU transmission in a WLAN according to any embodiment of the disclosure, when executed thereon.

According to a tenth aspect of the disclosure, various embodiments of the disclosure provide a chip. The chip configured to perform a method for soliciting a TB PPDU transmission in a WLAN according to any embodiment of the disclosure, when executed thereon.

BRIEF DESCRIPTION OF THE DRAWINGS

The disclosure will be described in detail with reference to the accompanying drawings, in which:

FIG. 5C is a schematic diagram showing an example of a trigger frame soliciting TB FD-A-PPDU transmission in a WLAN;

FIG. 6A is a block diagram illustrating a trigger frame format according to one embodiment of the disclosure;

FIG. 6B is a block diagram illustrating an example of a user info field format of trigger frame according to one embodiment of the disclosure;

FIG. 7 is a block diagram illustrating an example of the common info field format of trigger frame according to the first embodiment;

FIG. 8 is a block diagram illustrating an example of the common info field format of trigger frame according to the second embodiment;

FIG. 9 is a block diagram illustrating an example of the common info field format of trigger frame according to the third embodiment;

FIG. 10 is a flowchart illustrating a method for soliciting a TB PPDU transmission in a WLAN implemented by an AP according to some embodiments of the disclosure;

FIG. 11 is a flowchart illustrating a method for soliciting a TB PPDU transmission in a WLAN implemented by a STA according to some embodiments of the disclosure;

FIG. 12A is a schematic diagram illustrating an AP for soliciting a TB PPDU transmission in a WLAN according to one embodiment of the disclosure;

FIG. 12B is a schematic diagram illustrating an AP for soliciting a TB PPDU transmission in a WLAN according to one embodiment of the disclosure;

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

The disclosure of the methods and apparatuses for soliciting a TB PPDU transmission in a WLAN with a trigger frame can also be understand as methods and apparatuses for transmitting a TB PPDU transmission in a WLAN, which is a general summary of the disclosure, but not limit the specific feature of AP or STA, when executes this method.

Figure 1:
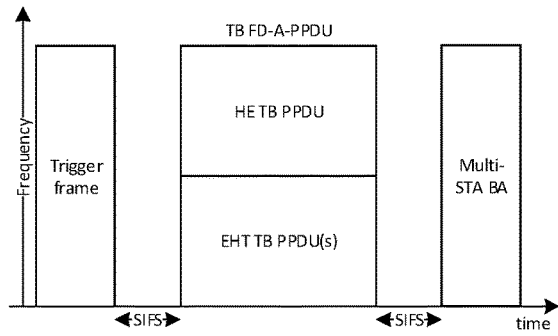
FIG. 1 is a schematic diagram illustrating an uplink multi-user (MU) transmission according to one embodiment of the disclosure.

FIG. 1 is a schematic diagram illustrating an uplink multi-user (MU) transmission according to one embodiment of the disclosure. When receiving a trigger frame from an AP which is used to solicit a TB FD-A-PPDU transmission from both HE STAs and EHT STAs, each of scheduled HE STAs and EHT STAs will transmit a TB PPDU based on the scheduling information in the received trigger frame. The TB PPDU transmitted by each of scheduled HE STAs is a HE TB PPDU while the TB PPDU transmitted by each of scheduled EHT STAs is a HE TB PPDU or an EHT TB PPDU.

Multiple HE TB PPDUs transmitted by different STAs at non-overlapping frequency-domain resource and/or spatial domain resource in a 20/40/80/160/320 MHz channel can be treated as a single HE TB PPDU. Similarly, multiple EHT TB PPDUs transmitted by different STAs at non-overlapping frequency-domain resource and/or spatial domain resource in a 20/40/80/160/320 MHz channel can be treated as a single EHT TB PPDU. The HE TB PPDUs and EHT TB PPDUs transmitted by all scheduled HE STAs and EHT STAs constitute a TB FD-A-PPDU. The AP will transmit a Multi-STA BlockAck (Multi-STA BA) frame in a response to the received TB FD-A-PPDU.

Figure 2A:
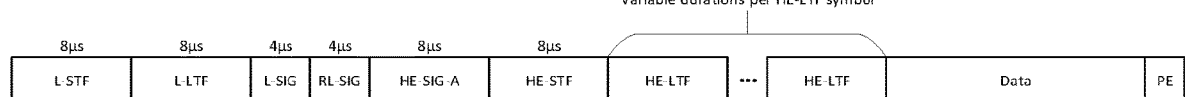
FIG. 2A is a block diagram illustrating a format of a HE TB PPDU.
Figure 2B:
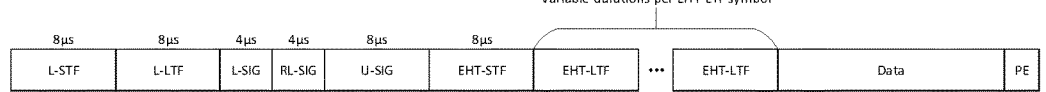
FIG. 2B is a block diagram illustrating a format of an EHT TB PPDU.

FIG. 2A is a block diagram illustrating a format of a HE TB PPDU and FIG. 2B is a block diagram illustrating a format of an EHT TB PPDU. In a HE TB PPDU, the Non-HT Short Training Field (L-STF), Non-HT Long Training Field (L-LTF), Non-HT SIGNAL Field (L-SIG), Repeated L-SIG field (RL-SIG field) and HE SIGNAL A field (HE-SIG-A field) are called pre-HE modulated fields while the HE Short Training Field (HE-STF), HE Long Training field (HE-LTF), Data field and Packet Extension (PE) field are called HE modulated fields. In an EHT TB PPDU, the L-STF, L-LTF, L-SIG field, RL-SIG field and U-SIG field are called pre-EHT modulated fields while the EHT Short Training Field (EHT-STF), EHT Long Training field (EHT-LTF), Data field and PE field are called EHT modulated fields.

Each HE-LTF or EHT-LTF symbol has the same Guard interval (GI) duration as each data symbol, which is 0.8 μs, 1.6 μs or 3.2 μs. The HE-LTF field comprises three types: 1x HE-LTF, 2×HE-LTF and 4×HE-LTF. Similarly, the EHT-LTF field comprises three types: 1× EHT-LTF, 2×EHT-LTF and 4×EHT-LTF. The duration of each 1×HE-LTF/EHT-LTF, 2×HE-LTF/EHT-LTF or 4×HE-LTF/EHT-LTF symbol without GI is 3.2 μs, 6.4 μs or 12.8 μs. Each data symbol without GI is 12.8 μs. The PE field duration of a HE TB PPDU is 0 μs, 4 μs, 8 μs, 12 μs or 16 μs; while the PE field duration of an EHT TB PPDU is 0 μs, 4 μs, 8 μs, 12 μs, 16 μs or 20 μs.

According to the present disclosure, in an EHT BSS with a large BW (e.g., 160 MHz or 320 MHz), a TB FD-A-PPDU used for uplink MU transmission may comprise one HE TB PPDU and one or two EHT TB PPDUs if the HE-LTF field has a same symbol duration and a same GI duration as the EHT-LTF field.

The number of HE-LTF symbols may be the same as or different from the number of EHT-LTF symbols. When the number of HE-LTF symbols is the same as the number of EHT-LTF symbols, each HE-LTF/EHT-LTF symbol may have a different duration or a same duration from each data symbol. In other words, each HE-LTF/EHT-LTF symbol without GI may be 6.4 μs or 12.8 μs. When the number of HE-LTF symbols is different from the number of EHT-LTF symbols, each HE-LTF/EHT-LTF symbol shall have a same duration as each data symbol. In other words, each HE-LTF/EHT-LTF symbol without GI shall be 12.8 μs. As a result, the pre-HE modulated fields of a HE TB PPDU and the pre-EHT modulated fields of an EHT TB PPDU can be kept orthogonal in frequency domain symbol-by-symbol.

For uplink MU transmission, each scheduled HE STA may park in primary 80 MHz channel (P80); while each scheduled EHT STA may park in one of non-primary 80 MHz channel(s) via an enhanced Selective subchannel transmission (SST) mechanism. A non-primary 80 MHz channel is an 80 MHz frequency segment outside P80, e.g., secondary 80 MHz channel (S80) in a 160 MHz or 320 MHz channel.

Figure 3:
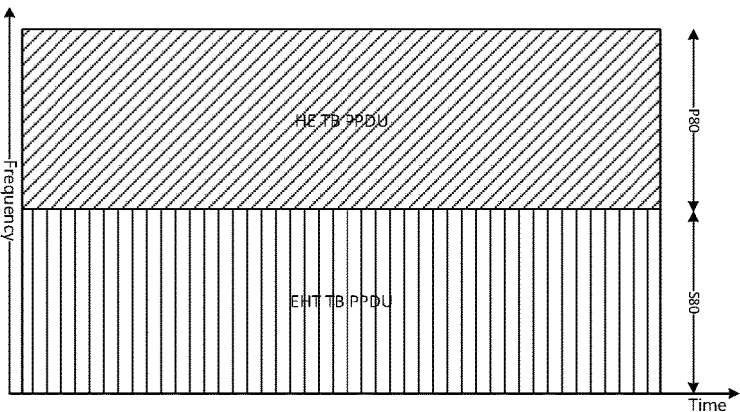
FIG. 3 is 160 MHz BW allocation for a TB FD-A-PPDU transmission according to one embodiment of the disclosure.

According to the present disclosure, in a 160 MHz BW TB FD-A-PPDU, the BW allocated to HE STAs is P80 while BW allocated to EHT STAs is S80. In this case, one HE TB PPDU may be transmitted in P80 while one EHT TB PPDU may be transmitted in S80. FIG. 3 is 160 MHz BW allocation for a TB FD-A-PPDU transmission according to one embodiment of the disclosure.

According to the present disclosure, in a 320 MHz BW TB FD-A-PPDU, the BW allocated to HE STAs is P80 or primary 160 MHz channel (P160); while the BW allocated to EHT STAs is one of two 80 MHz frequency segments of secondary 160 MHz channel (S160), S160, a combination of S80 and one of two 80 MHz frequency segments of S160 or a combination of S80 and S160.

Figure 4A:
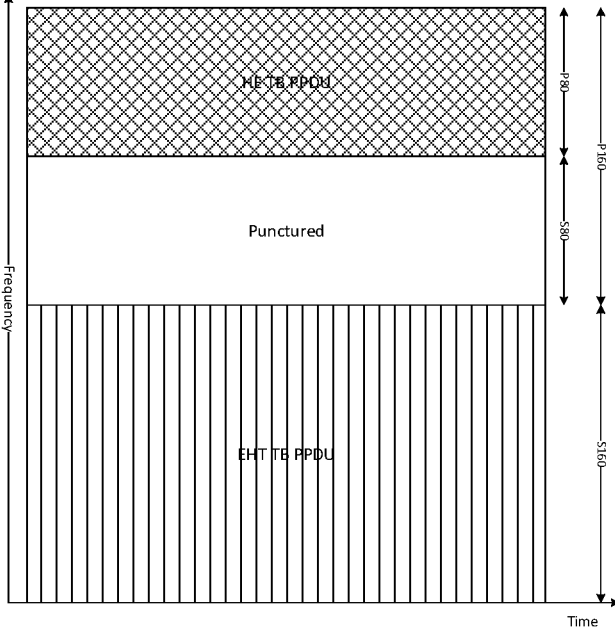
FIG. 4A is one option for 320 MHz BW allocation for a TB FD-A-PPDU transmission according to one embodiment of the disclosure.

For a 320 MHz BW FD-A-PPDU, there may have the following five options for BW allocation in the TB FD-A-PPDU:

Option 1A: When S80 is punctured, BW allocated to HE STAs is P80 and BW allocated to EHT STAs is S160, as illustrated in FIG. 4A. One HE TB PPDU may be transmitted in P80 while one EHT TB PPDU may be transmitted in S160.

Figure 4B:
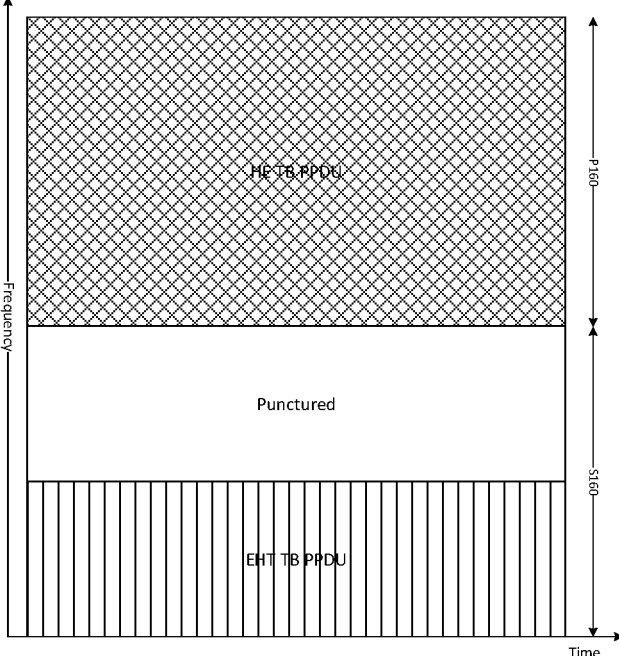
FIG. 4B is another option for 320 MHz BW allocation for a TB FD-A-PPDU transmission according to one embodiment of the disclosure.

Option 1B: When one of two 80 MHz frequency segments of S160 is punctured, BW allocated to HE STAs is P160 and BW allocated to EHT STAs is the other 80 MHz frequency segment of S160, as illustrated in FIG. 4B. One HE TB PPDU may be transmitted in P160 while one EHT TB PPDU may be transmitted in the unpunctured 80 MHz frequency segment of S160.

Figure 4C:
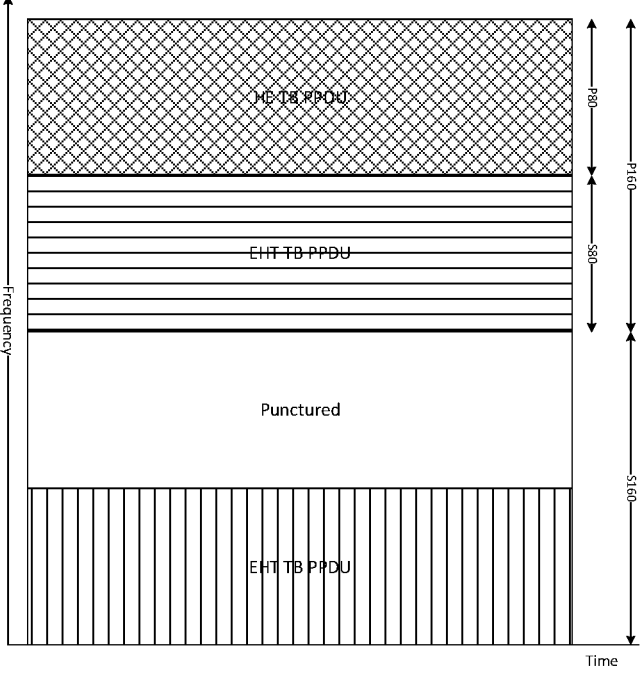
FIG. 4C is another option for 320 MHz BW allocation for a TB FD-A-PPDU transmission according to one embodiment of the disclosure.

Option 1C: When one of two 80 MHz frequency segments of S160 is punctured, BW allocated to HE STAs is P80 and BW allocated to EHT STAs is S80 and the other 80 MHz frequency segment of S160, as illustrated in FIG. 4C. One HE TB PPDU may be transmitted in P80 while two EHT TB PPDUs may be transmitted in S80 and the unpunctured 80 MHz frequency segment of S160, respectively.

Figure 4D:
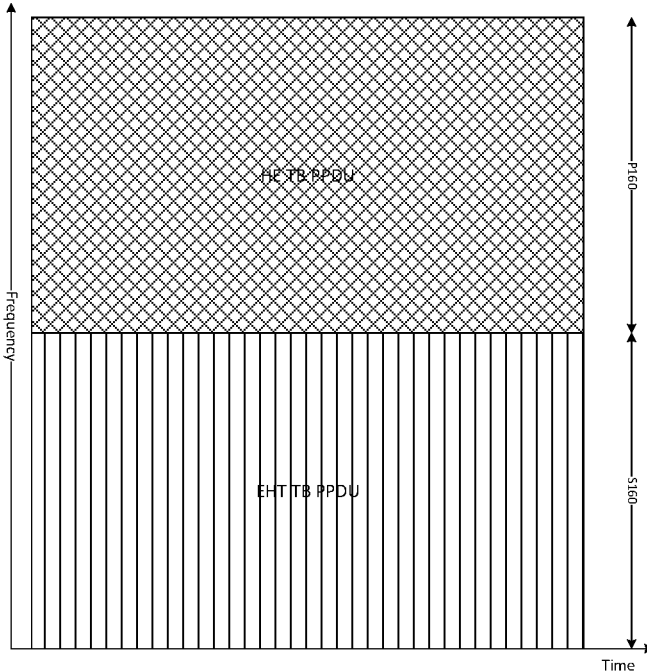
FIG. 4D is another option for 320 MHz BW allocation for a TB FD-A-PPDU transmission according to one embodiment of the disclosure.

Option 1D: When none of 80 MHz frequency segments is punctured, BW allocated to HE STAs is P160 and BW allocated to EHT STAs is S160, as illustrated in FIG. 4D. One HE TB PPDU may be transmitted in P160 while one EHT TB PPDU may be transmitted in S160.

Figure 4E:
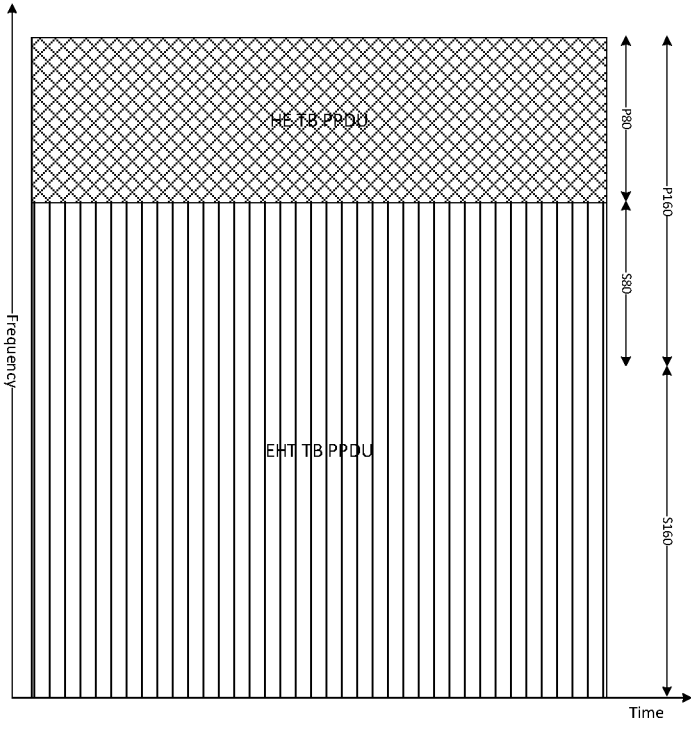
FIG. 4E is another option for 320 MHz BW allocation for a TB FD-A-PPDU transmission according to one embodiment of the disclosure.

Option 1E: When none of 80 MHz frequency segments is punctured, BW allocated to HE STAs is P80 and BW allocated to EHT STAs is S80 and S160, as illustrated in FIG. 4E. One HE TB PPDU may be transmitted in P80 while one EHT TB PPDU may be transmitted in S80 and S160.

Figure 5A:
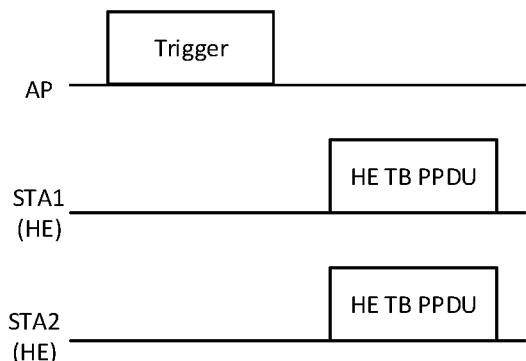
FIG. 5A is a schematic diagram showing an example of a trigger frame soliciting HE TB PPDU transmission in a WLAN.
Figure 5B:
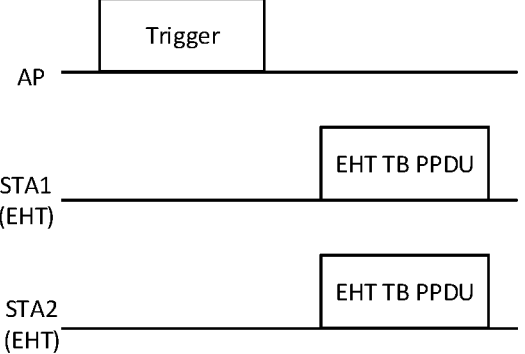
FIG. 5B is a schematic diagram showing an example of a trigger frame soliciting EHT TB PPDU transmission in a WLAN.

In IEEE 802.11be EHT WLAN, a trigger frame can be used to solicit HE TB PPDU transmissions from HE STAs, EHT TB PPDU transmissions from EHT STAs, or TB FD-A-PPDU transmission from both HE STAs and EHT STAs. However, the TB PPDU transmitted by each of scheduled HE STAs is a HE TB PPDU while the TB PPDU transmitted by each of scheduled EHT STAs is a HE TB PPDU or an EHT TB PPDU. FIG. 5A is a schematic diagram showing an example of a trigger frame soliciting HE TB PPDU transmission from two HE STAs in a WLAN. FIG. 5B is a schematic diagram showing an example of a trigger frame soliciting EHT TB PPDU transmission from two EHT STAs in a WLAN. FIG. 5C is a schematic diagram showing an example of a trigger frame soliciting TB FD-A-PPDU transmission from one HE STA and one EHT STA in a WLAN.

FIG. 6A is a block diagram illustrating a trigger frame format according to one embodiment of the disclosure. The trigger frame format shown in FIG. 6A includes a common info field and a user info list field comprising one or more user info fields. The formats of the common info field and user info field depend on the type of trigger frame.

FIG. 6B is a block diagram illustrating an example of a user info field format of trigger frame according to one embodiment of the disclosure. The HE/EHT format subfield of a user info field indicates whether the user info field follows the 802.11ax HE format or the 802.11be EHT format. The value of the HE/EHT format subfield of a user info field determines how the remaining subfields of the user info field are interpreted. The HE/EHT format subfield of a user info field is set to 0 to indicate the 802.11ax HE format and set to 1 to indicate the 802.11be EHT format. When the HE/EHT format subfield of a user info field is set to indicate the 802.11ax HE format, the lower/upper 160 MHz segment subfield is reserved, and the RU allocation subfield indicates a Resource unit (RU) at which a HE TB PPDU is to be transmitted by the STA indicated by the AID12 subfield. If the HE/EHT format subfield of a user info field is set to indicate the 802.11be EHT format, the RU allocation subfield and the lower/upper 160 MHz segment subfield indicate a RU or Multiple resource unit (MRU) at which an EHT TB PPDU is to be transmitted by the STA indicated by the AID12 subfield.

FIG. 10 is a flowchart illustrating a method 130 for soliciting a TB PPDU transmission in a WLAN implemented by an AP according to some embodiments of the disclosure. In this embodiment of the disclosure, the method 130 is implemented by an AP. In other embodiments, the method 130 may be implemented by any other suitable network interface device.

At block 1301, a trigger frame is generated by the AP based on a type of PPDU transmissions to be solicited from a plurality of STAs in the WLAN, e.g., HE STAs and/or EHT STAs. The type of PPDU transmissions comprises HE TB PPDU transmissions, EHT TB PPDU transmissions, or FD-A-PPDU transmissions, and one or two subfields in the trigger frame, e.g., UL BW subfield, UL BW subfield and Delta EHT UL BW, or UL BW subfield and UL BW Extension subfield, indicate a BW of the solicited TB PPDU.

At block 1302, the generated trigger frame is transmitted to the plurality of STAs.

In one embodiment, a common info field of the trigger frame comprises an UL BW subfield indicating a BW of the solicited HE TB PPDU.

In one embodiment, the UL BW subfield occupies 2 bits in the common info field of the trigger frame.

In one embodiment, the BW of the solicited HE TB PPDU is 20 MHz, 40 MHz, 80 MHz or 160/80+80 MHz.

In one embodiment, the BW of the solicited HE TB PPDU indicated by the UL BW subfield in the common info field of the trigger frame is in the HE SIGNAL A (HE SIG-A) field of the solicited HE TB PPDU.

In one embodiment, the common info field of the trigger frame further comprises an enhanced trigger frame flag subfield which indicates whether the trigger frame is an 802.11ax trigger frame or an enhanced trigger frame.

In one embodiment, the enhanced trigger frame includes a common info field and a user info list field comprising one or more user info fields.

In one embodiment, when the enhanced trigger frame flag subfield indicates that the trigger frame is an enhanced trigger frame, both the UL BW subfield and a Delta EHT UL BW subfield indicate a BW of the solicited EHT TB PPDU.

In one embodiment, the BW of the solicited EHT TB PPDU indicated by both the UL BW subfield and the Delta EHT UL BW subfield is in the universal SIGNAL (U-SIG) field of the solicited EHT TB PPDU.

In one embodiment, the Delta EHT UL BW subfield occupies 2 bits of the enhanced trigger frame.

In one embodiment, the BW of the solicited EHT TB PPDU is 20 MHz, 40 MHz, 80 MHz, 160 MHz or 320 MHz.

In one embodiment, the indicated BW of the solicited EHT TB PPDU is the same as the indicated BW of the solicited HE TB PPDU when the indicated BW of the solicited EHT TB PPDU is 20 MHz, 40 MHz, 80 MHz or 160 MHz.

In one embodiment, the indicated BW of the solicited EHT TB PPDU is the next available BW larger than the indicated BW of the solicited HE TB PPDU when the BW of the solicited EHT TB PPDU is 40 MHz, 80 MHz, 160 MHz or 320 MHz.

In one embodiment, the indicated BW of the solicited EHT TB PPDU is the next available BW smaller than the indicated BW of the solicited HE TB PPDU when the indicated BW of the solicited EHT TB PPDU is 20 MHz, 40 MHz or 80 MHz.

In another embodiment, when the enhanced trigger frame flag subfield indicates that the trigger frame is an enhanced trigger frame, both the UL BW subfield and a UL BW extension subfield indicate a BW of the solicited EHT TB PPDU.

In this embodiment, the BW of the solicited EHT TB PPDU indicated by both the UL BW subfield and UL BW extension subfield is in the universal SIGNAL (U-SIG) field of the solicited EHT TB PPDU.

In this embodiment, the BW of the solicited EHT TB PPDU is 20 MHz, 40 MHz, 80 MHz, 160 MHz or 320 MHz.

In this embodiment, the indicated BW of the solicited EHT TB PPDU is the next available BW larger than the indicated BW of the solicited HE TB PPDU when the BW of the solicited EHT TB PPDU is 40 MHz, 80 MHz, 160 MHz or 320 MHz.

In this embodiment, the indicated BW of the solicited EHT TB PPDU is the next available BW smaller than the indicated BW of the solicited HE TB PPDU when the indicated BW of the solicited EHT TB PPDU is 20 MHz, 40 MHz or 80 MHz.

FIG. 11 is a flowchart illustrating a method 140 for soliciting a TB PPDU transmission in a WLAN implemented by a STA according to some embodiments of the disclosure. In this embodiment of the disclosure, the method 140 is implemented by a STA. In other embodiments, the method 140 may be implemented by any other suitable client device.

At block 1401, a trigger frame from an AP is received by a STA, e.g., a HE STA and/or an EHT STA, the trigger frame is generated based on a type of PPDU transmissions to be solicited from a plurality of STAs, e.g., HE STAs and/or EHT STAs. The type of PPDU transmissions comprises HE TB PPDU transmissions, EHT TB PPDU transmissions or FD-A-PPDU transmissions, and one or two subfields in the trigger frame, e.g., UL BW subfield, UL BW subfield and Delta EHT UL BW, or UL BW subfield and UL BW Extension subfield, indicate a BW of the solicited TB PPDU.

At block 1402, the solicited TB PPDU in the BW indicated by the one or two subfields in the trigger frame is transmitted by the STA.

In one embodiment, a common info field of the trigger frame comprises an UL BW subfield indicating a BW of the solicited HE TB PPDU.

In one embodiment, the UL BW subfield occupies 2 bits in the common info field of the trigger frame.

In one embodiment, the BW of the solicited HE TB PPDU is 20 MHz, 40 MHz, 80 MHz or 160/80+80 MHz.

In one embodiment, the BW of the solicited HE TB PPDU indicated by the UL BW subfield in the common info field of the trigger frame is in the HE SIGNAL A (HE SIG-A) field of the solicited HE TB PPDU.

In one embodiment, the common info field of the trigger frame further comprises an enhanced trigger frame flag subfield which indicates whether the trigger frame is an 802.11ax trigger frame or an enhanced trigger frame.

In one embodiment, the enhanced trigger frame includes a common info field and a user info list field comprising one or more user info fields.

In one embodiment, when the enhanced trigger frame flag subfield indicates that the trigger frame is an enhanced trigger frame, both the UL BW subfield and a Delta EHT UL BW subfield indicate a BW of the solicited EHT TB PPDU.

In one embodiment, the BW of the solicited EHT TB PPDU indicated by both the UL BW subfield and the Delta EHT UL BW subfield is in the universal SIGNAL (U-SIG) field of the solicited EHT TB PPDU.

In one embodiment, the Delta EHT UL BW subfield occupies 2 bits of the enhanced trigger frame.

In one embodiment, the BW of the solicited EHT TB PPDU is 20 MHz, 40 MHz, 80 MHz, 160 MHz or 320 MHz.

In one embodiment, the indicated BW of the solicited EHT TB PPDU is the same as the indicated BW of the solicited HE TB PPDU when the indicated BW of the solicited EHT TB PPDU is 20 MHz, 40 MHz, 80 MHz or 160 MHz.

In one embodiment, the indicated BW of the solicited EHT TB PPDU is the next available BW larger than the indicated BW of the solicited HE TB PPDU when the BW of the solicited EHT TB PPDU is 40 MHz, 80 MHz, 160 MHz or 320 MHz.

In one embodiment, the indicated BW of the solicited EHT TB PPDU is the next available BW smaller than the indicated BW of the solicited HE TB PPDU when the indicated BW of the solicited EHT TB PPDU is 20 MHz, 40 MHz or 80 MHz.

In another embodiment, when the enhanced trigger frame flag subfield indicates that the trigger frame is an enhanced trigger frame, both the UL BW subfield and a UL BW extension subfield indicate a BW of the solicited EHT TB PPDU.

In this embodiment, the BW of the solicited EHT TB PPDU indicated by both the UL BW subfield and UL BW extension subfield is in the universal SIGNAL (U-SIG) field of the solicited EHT TB PPDU.

In this embodiment, the BW of the solicited EHT TB PPDU is 20 MHz, 40 MHz, 80 MHz, 160 MHz or 320 MHz.

In this embodiment, the indicated BW of the solicited EHT TB PPDU is the same as the indicated BW of the solicited HE TB PPDU when the indicated BW of the solicited EHT TB PPDU is 20 MHz, 40 MHz, 80 MHz or 160 MHz.

In this embodiment, the indicated BW of the solicited EHT TB PPDU is the next available BW larger than the indicated BW of the solicited HE TB PPDU when the BW of the solicited EHT TB PPDU is 40 MHz, 80 MHz, 160 MHz or 320 MHz.

In this embodiment, the indicated BW of the solicited EHT TB PPDU is the next available BW smaller than the indicated BW of the solicited HE TB PPDU when the indicated BW of the solicited EHT TB PPDU is 20 MHz, 40 MHz or 80 MHz.

FIG. 12A is a schematic diagram illustrating an AP 1500A for soliciting a TB PPDU transmission in a WLAN according to one embodiment of the disclosure. In this embodiment, the AP 1500A includes a generation unit 1501a and a first transmission unit 1502b. The generation unit 1501a is configured to generate a trigger frame based on a type of TB PPDU transmissions to be solicited from a plurality of STAs in the WLAN, e.g., HE STAs and/or EHT STAs. The type of TB PPDU transmissions comprises HE TB PPDU transmissions, EHT TB PPDU transmissions, or TB FD-A-PPDU transmissions, and one or two subfields, e.g., UL BW subfield, UL BW subfield and Delta EHT UL BW, or UL BW subfield and UL BW Extension subfield, in the trigger frame indicate a BW of the solicited TB PPDU. The first transmission unit 1502b is configured to transmit the solicited TB PPDU in the BW indicated by the one or two subfields in the trigger frame.

FIG. 12B is a schematic diagram illustrating an AP 1500B for soliciting a TB PPDU transmission in a WLAN according to one embodiment of the disclosure. The AP 1500B includes a memory 1501b configured to store instructions for soliciting a TB PPDU transmission in a WLAN, and a processor 1502b communicably coupled with the memory, the processor 1502b configured to execute the instructions to cause the AP 1500B to perform the method for soliciting a TB PPDU transmission in a WLAN according to some embodiments of the disclosure, e.g., the method described above and illustrated in FIG. 10.

Figure 13A:
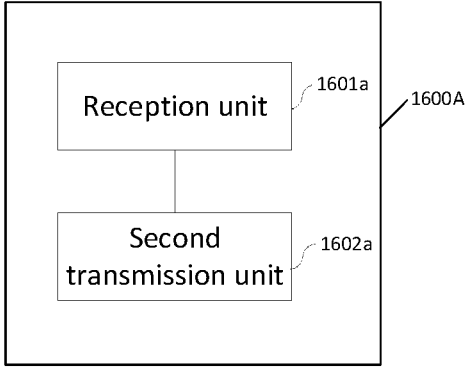
FIG. 13A is a schematic diagram illustrating a STA for soliciting a TB PPDU transmission in a WLAN according to one embodiment of the disclosure.

FIG. 13A is a schematic diagram illustrating a STA 1600A for soliciting a TB PPDU transmission in a WLAN according to one embodiment of the disclosure. In this embodiment, the STA 1600A includes a reception unit 1601a and a second transmission unit 1602b. The reception unit 1601a is configured to receive a trigger frame which is used to solicit a type of TB PPDU transmissions from a plurality of STAs in the WLAN, e.g., HE STAs and/or EHT STAs. The type of TB PPDU transmissions comprises HE TB PPDU transmissions, EHT TB PPDU transmissions, or TB FD-A-PPDU transmissions, and one or two subfields, e.g., UL BW subfield, UL BW subfield and Delta EHT UL BW, or UL BW subfield and UL BW Extension subfield, in the trigger frame indicate a bandwidth (BW) of the solicited TB PPDU. The second transmission unit 1602b is configured to transmit the solicited TB PPDU in the BW indicated by the one or two subfields in the trigger frame.

Figure 13B:
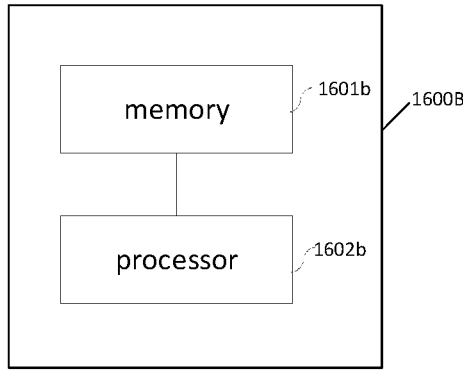
FIG. 13B is a schematic diagram illustrating a STA for soliciting a TB PPDU transmission in a WLAN according to one embodiment of the disclosure.

FIG. 13B is a schematic diagram illustrating a STA 1600B for soliciting a TB PPDU transmission in a WLAN according to one embodiment of the disclosure. The STA 1600B includes a memory 1601b configured to store instructions for soliciting a TB PPDU transmission in a WLAN, and a processor 1602b communicably coupled with the memory, the processor 1602b configured to execute the instructions to cause the STA 1600B to perform the method for soliciting a TB PPDU transmission in a WLAN according to some embodiments of the disclosure, e.g., the method described above and illustrated in FIG. 11.

FIG. 7 is a block diagram illustrating an example of the common info field format of trigger frame according to the first embodiment. The enhanced trigger frame flag subfield indicates whether the trigger frame is an 802.11ax trigger frame or an enhanced trigger frame. The enhanced trigger frame flag subfield is set to 0 to indicate an 802.11ax trigger frame; and set to 1 to indicate an enhanced trigger frame. When the enhanced trigger frame flag subfield is set to indicate an 802.11ax trigger frame, the UL BW Extension subfield is reserved, and the UL BW subfield indicates the BW in the HE-SIG-A field of the solicited HE TB PPDU which is 20 MHz, 40 MHz, 80 MHz or 160/80+80 MHz. When the enhanced trigger frame flag subfield is set to indicate an enhanced trigger frame, both the UL BW subfield and the UL BW extension subfield indicate the BW in the U-SIG of the solicited EHT TB PPDU which is 20 MHz, 40 MHz, 80 MHz, 160 MHz or 320 MHz.

The trigger frame with the common info field shown in FIG. 7 can be used to solicit HE TB PPDU transmission from HE STAs or EHT TB PPDU transmission from EHT STAs. For one example, when the trigger frame is used to solicit 160 MHz HE TB PPDU transmission from HE STAs, the enhanced trigger frame flag subfield of the common info field is set to indicate an 802.11ax trigger frame and the UL BW subfield is set to indicate 160/80+80 MHz BW. For another example, when the trigger frame is used to solicit 320 MHz EHT TB PPDU transmission from EHT STAs, the enhanced trigger frame flag subfield is set to indicate an enhanced trigger frame, and both the UL BW subfield and UL BW extension subfield are set to indicate 320 MHz BW.

The trigger frame with the common info field shown in FIG. 7 can also be used to solicit TB FD-A-PPDU transmission from both HE STAs and EHT STAs where the solicited TB FD-A-PPDU comprises one HE TB PPDU and one or two EHT TB PPDUs. In this case, the enhanced trigger frame flag subfield is set to indicate an enhanced trigger frame, the UL BW extension subfield is set to 0 and the UL BW subfield indicates the BW in the HE-SIG-A field of the one HE TB PPDU which is the same as the BW in the STAs, or TB FD-A-PPDU transmission from both HE STAs and EHT STAs. For one example, when the trigger frame is used to solicit 160 MHz HE TB PPDU transmission from HE STAs, the enhanced trigger frame flag subfield is set to indicate an 802.11ax trigger frame and the UL BW subfield is set to indicate 160/80+80 MHz BW. For another example, when the trigger frame is used to solicit 320 MHz EHT TB PPDU transmission from EHT STAs, the enhanced trigger frame flag subfield is set to indicate an enhanced trigger frame and the EHT UL BW subfield is set to indicate 320 MHz BW. When the trigger frame is used to solicit FD-A-PPDU transmission from both HE STAs and EHT STAs, the enhanced trigger frame flag subfield is set to indicate an enhanced trigger frame, and the values of both UL BW subfield and EHT UL BW subfield are set according to the BW and BW allocation of the solicited TB FD-A-PPDU as shown in Table 9.

TABLE 9

| Settings of UL BW subfield and EHT UL BW subfield when the trigger frame is used to solicit FD-A-PPDU transmission according to the second embodiment | | | |
|---|---|---|---|
| FD-A-PPDU BW | BW Allocation Option | UL BW subfield indication | EHT UL BW subfield indication |
| 160 MHz | | 80 MHz | 80 MHz |
| 320 MHz | 1A | 80 MHz | 160 MHz |
| | 1B | 160 MHz | 80 MHz |
| | 1C | 80 MHz | 80 MHz |
| | 1D | 160 MHz | 160 MHz |
| | 1E | 80 MHz | 320 MHz |

U-SIG fields of the one or two EHT TB PPDUs. The UL BW subfield of the common info field of the trigger frame may be set to indicate a half of the BW of the solicited TB FD-A-PPDU. For one example, when the trigger frame is used to solicit 160 MHz BW TB FD-A-PPDU transmission, the UL BW subfield is set to indicate 80 MHz. For another example, when the trigger frame is used to solicit 320 MHz BW TB FD-A-PPDU transmission, the UL BW subfield is set to indicate 160 MHz. However, by doing so, in case of BW allocation option 1A, 1B or 1E for 320 MHz BW TB FD-A-PPDU comprising one HE TB PPDU and one or two EHT TB PPDUs, the BW in the HE-SIG-A field of the one HE TB PPDU is not the same as its allocated BW and the BW in the U-SIG fields of the one or two EHT TB PPDUs is not the same as their respective allocated BW.

FIG. 8 is a block diagram illustrating an example of the common info field format of trigger frame according to the second embodiment. The enhanced trigger frame flag subfield is used to indicate whether the trigger frame is an 802.11ax trigger frame or an enhanced trigger frame. The enhanced trigger frame flag subfield is set to 0 to indicate an 802.11ax trigger frame; and set to 1 to indicate an enhanced trigger frame. When the enhanced trigger frame flag subfield is set to indicate an 802.11ax trigger frame, the EHT UL BW subfield is reserved, and the UL BW subfield indicates the BW in the HE-SIG-A field of the solicited HE TB PPDU. When the enhanced trigger frame flag subfield is set to indicate an enhanced trigger frame, the UL BW subfield indicates the BW in the HE-SIG-A field of the one HE TB PPDU in the solicited TB FD-A-PPDU, and the EHT UL BW subfield indicates the BW in the U-SIG field of the solicited EHT TB PPDU or the U-SIG fields of the one or two EHT TB PPDUs in the solicited TB FD-A-PPDU.

The trigger frame with the common info field shown in FIG. 8 can be used to solicit HE TB PPDU transmission from HE STAs, EHT TB PPDU transmission from EHT It should be observed from Table 9 that in terms of BW allocation option 1A for 320 MHz BW TB FD-A-PPDU, the BW allocated to one HE TB PPDU is 80 MHz and the BW allocated to one EHT TB PPDU is 160 MHz. As a result, the UL BW subfield is set to indicate 80 MHz BW for the HE TB PPDU and the EHT UL BW subfield is set to indicate 160 MHz BW for the EHT TB PPDU. In terms of BW allocation option 1B for 320 MHz BW TB FD-A-PPDU, the BW allocated to one HE TB PPDU is 160 MHz and the BW allocated to one EHT TB PPDU is 80 MHz. As a result, the UL BW subfield is set to indicate 160 MHz BW for the HE TB PPDU and the EHT UL BW subfield is set to indicate 80 MHz BW for the EHT TB PPDU. In terms of BW allocation option 1C for 320 MHz BW TB FD-A-PPDU, the BW allocated to one HE TB PPDU is 80 MHz and the BW allocated to each of two EHT TB PPDUs is 80 MHz. As a result, the UL BW subfield is set to indicate 80 MHz BW for the HE TB PPDU and the EHT UL BW subfield is set to indicate 80 MHz BW for each of the two EHT TB PPDUs. In terms of BW allocation option 1D for 320 MHz BW TB FD-A-PPDU, the BW allocated to one HE TB PPDU is 160 MHz and the BW allocated to one EHT TB PPDU is 160 MHz. As a result, both the UL BW subfield and the EHT UL BW subfield are set to indicate 160 MHz BW. In terms of BW allocation option 1E for 320 MHz BW TB FD-A-PPDU, the BW allocated to one HE TB PPDU is 80 MHz and the BW allocated to one EHT TB PPDU is 240 MHz. As a result, the UL BW subfield is set to indicate 80 MHz BW for the HE TB PPDU and the EHT UL BW subfield is set to indicate 320 MHz BW since there is no 240 MHz EHT TB PPDU and 240 MHz transmission is obtained by puncturing an 80 MHz frequency segment from 320 MHz EHT TB PPDU.

According to the second embodiment, regardless of BW allocation options for 320 MHz BW TB FD-A-PPDU comprising one HE TB PPDU and one or two EHT TB PPDUs, the BW in the HE-SIG-A field of the one HE TB PPDU is the same as its allocated BW and the BW in the U-SIG fields of the one or two EHT TB PPDUs is the same as their respective allocated BW.

FIG. 9 is a block diagram illustrating an example of the common info field format of trigger frame according to the third embodiment. The enhanced trigger frame flag subfield is used to indicate whether the trigger frame is an 802.11ax trigger frame or an enhanced trigger frame. The enhanced trigger frame flag subfield is set to 0 to indicate an 802.11ax trigger frame; and set to 1 to indicate an enhanced trigger frame. When the enhanced trigger frame flag subfield is set to indicate an 802.11ax trigger frame, the Delta EHT UL BW subfield is reserved, and the UL BW subfield indicates the BW in the HE-SIG-A field of the solicited HE TB PPDU. When the enhanced trigger frame flag subfield is set to indicate an enhanced trigger frame, the UL BW subfield indicates the BW in the HE-SIG-A field of the one HE TB PPDU in the solicited TB FD-A-PPDU, and both the Delta EHT UL BW subfield and the UL BW subfield indicate the BW in the U-SIG field of the solicited EHT TB PPDU or the U-SIG fields of the one or two EHT TB PPDUs in the solicited TB FD-A-PPDU. In one embodiment, the Delta EHT UL BW subfield is set to 0 to indicate the BW in the U-SIG field of the solicited EHT TB PPDU or the U-SIG fields of the one or two EHT TB PPDUs in the solicited TB FD-A-PPDU is the same as the BW indicated in the UL BW subfield. The BW in the U-SIG field of the solicited EHT TB PPDU and the BW in the U-SIG fields of the one or two EHT TB PPDUs in the solicited TB FD-A-PPDU could be 20 MHz or 40 MHz or 80 MHz or 160 MHz. The Delta EHT UL BW subfield is set to 1 to indicate the BW in the U-SIG field of the solicited EHT TB PPDU or the U-SIG fields of the one or two EHT TB PPDUs in the solicited TB FD-A-PPDU is the next available BW larger than the BW indicated in the UL BW subfield. The Delta EHT UL BW subfield is set to 2 to indicate the BW in the U-SIG field of the solicited EHT TB PPDU or the U-SIG fields of the one or two EHT TB PPDUs in the solicited TB FD-A-PPDU is the second next available BW larger than the BW indicated in the UL BW subfield. The Delta EHT UL BW subfield is set to 3 to indicate the BW in the U-SIG field of the solicited EHT TB PPDU or the U-SIG fields of the one or two EHT TB PPDUs in the solicited TB FD-A-PPDU is the next available BW smaller than the BW indicated in the UL BW subfield. For example, when the UL BW subfield is set to indicate 80 MHz BW and the Delta EHT UL BW subfield is set to 0, the BW in the U-SIG field of the solicited EHT TB PPDU or the U-SIG fields of the one or two EHT TB PPDUs in the solicited TB FD-A-PPDU is 80 MHz. When the UL BW subfield is set to indicate 80 MHz BW and the Delta EHT UL BW subfield is set to 1, the BW in the U-SIG field of the solicited EHT TB PPDU or the U-SIG fields of the one or two EHT TB PPDUs in the solicited TB FD-A-PPDU is 160 MHz. When the UL BW subfield is set to indicate 80 MHz BW and the Delta EHT UL BW subfield is set to 2, the BW in the U-SIG field of the solicited EHT TB PPDU or the U-SIG fields of the one or two EHT TB PPDUs in the solicited TB FD-A-PPDU is 320 MHz. When the UL BW subfield is set to indicate 160 MHz BW and the Delta EHT UL BW subfield is set to 3, the BW in the U-SIG field of the solicited EHT TB PPDU or the U-SIG fields of the one or two EHT TB PPDUs in the solicited TB FD-A-PPDU is 80 MHz. The valid combinations of the UL BW subfield indication and the Delta EHT UL BW subfield value are shown in Table 11.

TABLE 11

Valid combinations of the UL BW subfield indication and the Delta EHT UL BW subfield value according to the third embodiment

| UL BW subfield indication | Delta EHT UL BW subfield value | BW in U-SIG of EHT TB PPDU |
|---|---|---|
| 20/40/80/160 MHz | 0 | 20/40/80/160 MHz |
| 20 MHz | 1 | 40 MHz |
| 20 MHz | 2 | 80 MHz |
| 40 MHz | 1 | 80 MHz |
| 40 MHz | 2 | 160 MHz |
| 40 MHz | 3 | 20 MHz |
| 80 MHz | 1 | 160 MHz |
| 80 MHz | 2 | 320 MHz |
| 80 MHz | 3 | 40 MHz |
| 160 MHz | 1 | 320 MHz |
| 160 MHz | 3 | 80 MHz |

When the enhanced trigger frame flag subfield is set to indicate an enhanced trigger frame, the UL BW subfield indicates the BW in the HE-SIG-A. As an example, the trigger frame with the common info field shown in FIG. 9 can be used to solicit HE TB PPDU transmission from HE STAs, EHT TB PPDU transmission from EHT STAs, or TB FD-A-PPDU transmission from both HE STAs and EHT STAs. And the TB PPDU transmitted by each of scheduled HE STAs is a HE TB PPDU while the TB PPDU transmitted by each of scheduled EHT STAs is a HE TB PPDU or an EHT TB PPDU. For one example, when the trigger frame is used to solicit 160 MHz HE TB PPDU transmission from HE STAs, the enhanced trigger frame flag subfield is set to indicate an 802.11ax trigger frame and the UL BW subfield is set to indicate 160/80+80 MHz BW. For another example, when the trigger frame is used to solicit 320 MHz EHT TB PPDU transmission from EHT STAs, the enhanced trigger frame flag subfield is set to indicate an enhanced trigger frame, the UL BW subfield is set to indicate 80 MHz BW and the Delta EHT UL BW subfield is set to 2. When the trigger frame is used to solicit FD-A-PPDU transmission from both HE STAs and EHT STAs, the enhanced trigger frame flag subfield is set to indicate an enhanced trigger frame, and the UL BW subfield and Delta EHT UL BW subfield are set according to the FD-A-PPDU's BW and BW allocation option as shown in Table 12.

TABLE 12

Settings of UL BW subfield and Delta EHT UL BW subfield when the trigger frame is used to solicit FD-A-PPDU transmission according to the third embodiment

| FD-A-PPDU BW | BW Allocation Option | UL BW subfield indication | Delta EHT UL BW subfield value |
|---|---|---|---|
| 160 MHz | | 80 MHz | 0 |
| 320 MHz | 1A | 80 MHz | 1 |
| | 1B | 160 MHz | 3 |
| | 1C | 80 MHz | 0 |
| | 1D | 160 MHz | 0 |
| | 1E | 80 MHz | 2 |

It can be observed from Table 12 that in terms of BW allocation option 1A for 320 MHz BW TB FD-A-PPDU, the BW allocated to one HE TB PPDU is 80 MHz and the BW allocated to one EHT TB PPDU is 160 MHz. As a result, the UL BW subfield is set to indicate 80 MHz BW and the Delta EHT UL BW subfield is set to 1. In terms of BW allocation option 1B for 320 MHz BW TB FD-A-PPDU, the BW allocated to one HE TB PPDU is 160 MHz and the BW allocated to one EHT TB PPDU is 80 MHz. As a result, the UL BW subfield is set to indicate 160 MHz BW and the Delta EHT UL BW subfield is set to 3. In terms of BW allocation option 1C for 320 MHz BW TB FD-A-PPDU, the BW allocated to one HE TB PPDU is 80 MHz and the BW allocated to each of two EHT TB PPDUs is 80 MHz. As a result, the UL BW subfield is set to indicate 80 MHz BW and the Delta EHT UL BW subfield is set to 0. In terms of BW allocation option 1D for 320 MHz BW TB FD-A-PPDU, the BW allocated to one HE TB PPDU is 160 MHz and the BW allocated to one EHT TB PPDU is 160 MHz. As a result, the UL BW subfield is set to indicate 160 MHz BW and the Delta EHT UL BW subfield is set to 0. In terms of BW allocation option 1E for 320 MHz BW TB FD-A-PPDU, the BW allocated to one HE TB PPDU is 80 MHz and the BW allocated to one EHT TB PPDU is 240 MHz. As a result, the UL BW subfield is set to indicate 80 MHz BW and the Delta EHT UL BW subfield is set to 2 since there is no 240 MHz EHT TB PPDU and 240 MHz transmission is obtained by puncturing an 80 MHz frequency segment from 320 MHz EHT TB PPDU.

According to the third embodiment, regardless of BW allocation options for 320 MHz BW TB FD-A-PPDU comprising one HE TB PPDU and one or two EHT TB PPDUs, the BW in the HE-SIG-A field of the one HE TB PPDU is the same as its allocated BW and the BW in the U-SIG fields of the one or two EHT TB PPDUs is the same as their respective allocated BW.

Compared to the second embodiment where the 3-bit EHT UL BW subfield is included in the common info field of the trigger frame, one more reserved bit is available in the common info field of the trigger frame for the third embodiment due to the 2-bit Delta EHT UL BW subfield.

According to the present disclosure, the common info field of the trigger frame comprises a UL BW subfield and a subfield.

In a first aspect, when the trigger frame is used to solicit TB FD-A-PPDU transmission where the solicited TB FD-A-PPDU comprises one HE TB PPDU and one or two EHT TB PPDUs, the UL BW subfield indicates the BW in the HE-SIG-A field of the one HE TB PPDU, which is the same as the BW in the U-SIG fields of the one or two EHT TB PPDUs; and the BW indicated in the UL BW subfield may be equal to a half of the BW of the solicited TB FD-A-PPDU. When the trigger frame is used to solicit EHT TB PPDU transmission, both the UL BW subfield and the subfield indicate the BW in the HE-SIG-A field of the solicited EHT TB PPDU.

In a second aspect, when the trigger frame is used to solicit TB FD-A-PPDU transmission or EHT TB PPDU transmission, the UL BW subfield indicates the BW in the HE-SIG-A field of the one HE TB PPDU in the solicited TB FD-A-PPDU and the subfield indicates the BW in the U-SIG fields of the one or two EHT TB PPDUs in the solicited TB FD-A-PPDU or the U-SIG field of the solicited EHT TB PPDU. The values of the UL BW subfield and the subfield may be set according to the BW and BW allocation of the solicited TB FD-A-PPDU.

In a third aspect, when the trigger frame is used to solicit TB FD-A-PPDU transmission or EHT TB PPDU transmission, the UL BW subfield indicates the BW in the HE-SIG-A field of the one HE TB PPDU in the solicited TB FD-A-PPDU, and both the UL BW subfield and the subfield indicate the BW in the U-SIG fields of the one or two EHT TB PPDUs in the solicited TB FD-A-PPDU or the U-SIG field of the solicited EHT TB PPDU.

Various embodiments of the disclosure also provide a computer program product comprising instructions to cause a computer to perform a method for soliciting a TB PPDU transmission in a WLAN according to any embodiment of the disclosure, when executed thereon.

Various embodiments of the disclosure also provide a computer program comprising instructions to cause a computer to perform a method for soliciting a TB PPDU transmission in a WLAN according to any embodiment of the disclosure, when executed thereon.

Various embodiments of the disclosure also provide a non-volatile storage medium comprising computer program codes to cause a computer to perform a method for soliciting a TB PPDU transmission in a WLAN according to any embodiment of the disclosure, when executed thereon.

Various embodiments of the disclosure also provide a chip configured to perform a method for soliciting a TB PPDU transmission in a WLAN according to any embodiment of the disclosure, when executed thereon.

It is to be understood that the embodiments and features described above should be considered exemplary and not restrictive. Many other embodiments will be apparent to those skilled in the art from consideration of the specification and practice of the disclosure. The scope of the disclosure should, therefore, be determined with reference to the appended claims, along with the full scope of equivalents to which such claims are entitled. Furthermore, certain terminology has been used for the purposes of descriptive clarity, and not to limit the disclosed embodiments of the disclosure.

The invention claimed is:

1. A method for soliciting a trigger-based (TB) physical layer protocol data unit (PPDU) transmission in a wireless local area network (WLAN), the method comprising:

receiving, by a station (STA), a trigger frame which is used to solicit a type of TB PPDU transmissions from a plurality of STAs in the WLAN, wherein the type of TB PPDU transmissions comprises high efficiency (HE) trigger-based (TB) PPDU transmissions or extremely high throughput (EHT) TB PPDU transmissions, and one or two subfields in the trigger frame indicate a bandwidth (BW) of the solicited TB PPDU, and transmitting, by the STA, the solicited TB PPDU in the BW indicated by the one or two subfields in the trigger frame;

wherein a common info field of the trigger frame comprises an uplink (UL) bandwidth (BW) subfield indicating a BW of the solicited HE TB PPDU;

wherein the common info field of the trigger frame further comprises an enhanced trigger frame flag subfield which indicates whether the trigger frame is an 802.11ax trigger frame or an enhanced trigger frame;

wherein when the enhanced trigger frame flag subfield indicates that the trigger frame is an enhanced trigger frame, both the UL BW subfield and a Delta EHT UL BW subfield indicate a BW of the solicited EHT TB PPDU;

wherein the UL BW subfield occupies 2 bits in the common info field of the trigger frame and the Delta EHT UL BW subfield occupies 2 bits of the enhanced trigger frame.

2. The method according to claim 1, wherein the BW of the solicited HE TB PPDU indicated by the UL BW subfield in the common info field of the trigger frame is in a HE SIGNAL A (HE SIG-A) field of the solicited HE TB PPDU.

3. The method according to claim 1, wherein the BW of the solicited EHT TB PPDU indicated by both the UL BW subfield and the Delta EHT UL BW subfield is in a universal SIGNAL (U-SIG) field of the solicited EHT TB PPDU.

4. The method according to claim 1, wherein the BW of the solicited EHT TB PPDU is 20 MHz, 40 MHz, 80 MHz, 160 MHz or 320 MHz.

5. The method according to claim 1, wherein an indicated BW of the solicited EHT TB PPDU is the same as an indicated BW of the solicited HE TB PPDU when the indicated BW of the solicited EHT TB PPDU is 20 MHz, 40 MHz, 80 MHz or 160 MHz.

6. The method according to claim 1, wherein an indicated BW of the solicited EHT TB PPDU is a next available BW larger than an indicated BW of the solicited HE TB PPDU when the indicated BW of the solicited EHT TB PPDU is 320 MHz.

7. The method according to claim 1, wherein an indicated BW of the solicited EHT TB PPDU is a next available BW smaller than an indicated BW of the solicited HE TB PPDU when the indicated BW of the solicited EHT TB PPDU is 80 MHz.

8. The method according to claim 1, wherein the enhanced trigger frame includes a common info field and a user info list field comprising one or more user info fields.

9. The method according to claim 1, wherein the BW of the solicited HE TB PPDU is 20 MHz, 40 MHz, 80 MHz or 160/80+80 MHz.

10. The method according to claim 1, wherein the plurality of STAs comprises at least one of HE STAs or EHT STAs.

11. The method according to claim 1, wherein both the UL BW subfield and the Delta EHT UL BW subfield jointly indicate the BW of the solicited EHT TB PPDU.

12. A station (STA) for soliciting a trigger-based (TB) physical layer protocol data unit (PPDU) in a wireless local area network (WLAN), wherein the STA comprises:

a processor; and a memory storing instructions executable by the processor;

wherein when the instructions are executed by the processor, the STA is caused to:

receive a trigger frame which is used to solicit a type of TB PPDU transmissions from a plurality of STAs in the WLAN, wherein the type of TB PPDU transmissions comprises high efficiency (HE) trigger-based (TB) PPDU transmissions or extremely high throughput (EHT) TB PPDU transmissions, and one or two subfields in the trigger frame indicate a bandwidth (BW) of the solicited TB PPDU, and transmit the solicited TB PPDU in the BW indicated by the one or two subfields in the trigger frame;

wherein a common info field of the trigger frame comprises an uplink (UL) bandwidth (BW) subfield indicating a BW of the solicited HE TB PPDU;

wherein the common info field of the trigger frame further comprises an enhanced trigger frame flag subfield which indicates whether the trigger frame is an 802.11ax trigger frame or an enhanced trigger frame;

wherein when the enhanced trigger frame flag subfield indicates that the trigger frame is an enhanced trigger frame, both the UL BW subfield and a Delta EHT UL BW subfield indicate a BW of the solicited EHT TB PPDU;

wherein the UL BW subfield occupies 2 bits in the common info field of the trigger frame and the Delta EHT UL BW subfield occupies 2 bits of the enhanced trigger frame.

13. The STA according to claim 12, wherein the BW of the solicited HE TB PPDU indicated by the UL BW subfield in the common info field of the trigger frame is in a HE SIGNAL A (HE SIG-A) field of the solicited HE TB PPDU.

14. The STA according to claim 12, wherein the BW of the solicited EHT TB PPDU indicated by both the UL BW subfield and the Delta EHT UL BW subfield is in a universal SIGNAL (U-SIG) field of the solicited EHT TB PPDU.

15. The STA according to claim 12, wherein the BW of the solicited EHT TB PPDU is 20 MHz, 40 MHz, 80 MHz, 160 MHz or 320 MHz.

16. The STA according to claim 12, wherein an indicated BW of the solicited EHT TB PPDU is the same as an indicated BW of the solicited HE TB PPDU when the indicated BW of the solicited EHT TB PPDU is 20 MHz, 40 MHz, 80 MHz or 160 MHz.

17. The STA according to claim 12, wherein an indicated BW of the solicited EHT TB PPDU is a next available BW larger than an indicated BW of the solicited HE TB PPDU when the indicated BW of the solicited EHT TB PPDU is 320 MHz.

18. The STA according to claim 12, wherein an indicated BW of the solicited EHT TB PPDU is a next available BW smaller than an indicated BW of the solicited HE TB PPDU when the indicated BW of the solicited EHT TB PPDU is 80 MHz.

19. The STA according to claim 12, wherein the enhanced trigger frame includes a common info field and a user info list field comprising one or more user info fields.

20. The STA according to claim 12, wherein the BW of the solicited HE TB PPDU is 20 MHz, 40 MHz, 80 MHz or 160/80+80 MHz.

* * * * *